(12) United States Patent
Hashimoto

(10) Patent No.: US 10,701,568 B2
(45) Date of Patent: Jun. 30, 2020

(54) DATA SUPPLY DEVICE, DISPLAY SYSTEM AND DATA SUPPLY METHOD

(71) Applicant: SEIKO EPSON CORPORATION, Tokyo (JP)

(72) Inventor: Hiroyuki Hashimoto, Hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 100 days.

(21) Appl. No.: 15/774,308

(22) PCT Filed: Nov. 9, 2016

(86) PCT No.: PCT/JP2016/083275
§ 371 (c)(1),
(2) Date: May 8, 2018

(87) PCT Pub. No.: WO2017/086223
PCT Pub. Date: May 26, 2017

(65) Prior Publication Data
US 2019/0166507 A1    May 30, 2019

Related U.S. Application Data

(60) Provisional application No. PCT/JP2016/083275, filed on Nov. 9, 2016.

(30) Foreign Application Priority Data

Nov. 16, 2015   (JP) ................. 2015-223884

(51) Int. Cl.
*H04W 16/28*      (2009.01)
*H04B 7/10*       (2017.01)
(Continued)

(52) U.S. Cl.
CPC .......... *H04W 16/28* (2013.01); *H04B 7/0695* (2013.01); *H04B 7/10* (2013.01);
(Continued)

(58) Field of Classification Search
CPC ........................... H04B 7/0695; H04W 16/28
See application file for complete search history.

(56) References Cited

U.S. PATENT DOCUMENTS 6,763,062 B1    7/2004  Kohno et al.
8,954,083 B1 *  2/2015  Yenney ................. H04W 16/18
                                              370/328
(Continued)

FOREIGN PATENT DOCUMENTS

JP    H06-284057 A    10/1994
JP    2000-307494 A   11/2000
(Continued)

OTHER PUBLICATIONS

Jan. 31, 2017 International Search Report issued in International Patent Application No. PCT/JP2016/083275.

*Primary Examiner* — Hsinchun Liao
(74) *Attorney, Agent, or Firm* — Oliff PLC

(57) ABSTRACT

A data supply device includes a transmission section adapted to transmit data via an electrical wave, and a control section adapted to switch an operation mode of the transmission section to either one of a first mode of searching for an optimum transmission direction of the electrical wave while transmitting the data, and a second mode in which the transmission direction is fixed.

11 Claims, 4 Drawing Sheets

(51) Int. Cl.
　　　*H04B 7/06*　　　(2006.01)
　　　*H04N 21/442*　　(2011.01)
　　　*H04N 21/41*　　　(2011.01)
　　　*H04W 72/04*　　　(2009.01)

(52) U.S. Cl.
　　　CPC ... *H04N 21/4122* (2013.01); *H04N 21/44227* (2013.01); *H04W 72/046* (2013.01)

(56) References Cited

U.S. PATENT DOCUMENTS

| | | | |
|---|---|---|---|
| 2002/0187813 A1* | 12/2002 | Guo | H04B 7/0634 455/562.1 |
| 2004/0204108 A1* | 10/2004 | Etkin | H04W 16/28 455/562.1 |
| 2006/0116092 A1 | 6/2006 | Uno et al. | |
| 2010/0026575 A1 | 2/2010 | Maruhashi et al. | |

FOREIGN PATENT DOCUMENTS

| | | |
|---|---|---|
| JP | 2000-332666 A | 11/2000 |
| JP | 2006-148928 A | 6/2006 |
| JP | 2006-270339 A | 10/2006 |
| JP | 2009-021935 A | 1/2009 |
| WO | 2008/090836 A1 | 7/2008 |

\* cited by examiner

DATA SUPPLY DEVICE, DISPLAY SYSTEM AND DATA SUPPLY METHOD

TECHNICAL FIELD

The present invention relates to a technology for wirelessly supplying data.

BACKGROUND ART

There is known a data supply device which receives input of image data from a video supply device, and then wirelessly transmits the image data thus input to a display device such as a projector. In such a data supply device, there is known a technology of beam forming for controlling the direction of an electrical wave (beam) to a specific direction (e.g., PTL1). In PTL1, there is described a technology of dynamically switching the direction of the beam in order to search for an optimum transmission channel.

CITATION LIST

Patent Literature

PTL 1: International Publication No. WO 2008/090836

SUMMARY OF INVENTION

Technical Problem

In the technology described in PTL1, if the optimum transmission channel is falsely recognized due to a variety of disturbances, there is a possibility that the transmission channel is instantaneously switched to make the data transmission rather unstable.

In contrast, the invention provides a technology of improving the stability of the communication between a data supply device and a data reception device.

Solution to Problem

According to the invention, there is provided a data supply device including a transmission section adapted to transmit data via an electrical wave, and a control section adapted to switch an operation mode of the transmission section to either one of a first mode of searching for an optimum transmission direction of the electrical wave while transmitting the data, and a second mode in which the transmission direction is fixed.

According to this data supply device, it is possible to further stabilize the communication compared to the configuration of always searching for the optimum transmission direction of the electrical wave while transmitting the data.

It is also possible for the data supply device to have an operation section adapted to designate the operation mode.

According to this data supply device, it is possible to designate the operation mode in accordance with the instruction of the user.

It is possible that the data supply device include a first storage section adapted to store information for identifying the optimum transmission direction, and in a case in which the second mode is designated as the operation mode in the operation section in a case in which the data supply device is powered ON, the control section controls the transmission direction of the electrical wave to a direction identified by the information stored in the first storage section.

According to this data supply device, it is possible to follow the transmission direction in the previous operation in the case in which the second mode is designated.

In a case in which a transmission condition of the electrical wave gets worse than a predetermined condition while the transmission section is operating in the second mode, it is possible for the control section to switch the operation mode to the first mode.

According to this data supply device, it is possible to search for the optimum transmission direction of the electrical wave in the case in which the transmission condition of the electrical wave has gotten worse.

In a case in which the data supply device is powered ON, it is possible for the control section to set the operation mode to the first mode.

According to this data supply device, it is possible to automatically search for the optimum transmission direction of the electrical wave in the case in which the data supply device is powered ON.

In a case in which no data has been input, it is possible for the control section to switch the operation mode to the first mode.

According to this data supply device, it is possible to switch the operation mode to the first mode in the case in which no data has been supplied.

It is possible for the transmission section to transmit data of a test pattern determined in advance via the electrical wave.

According to this data supply device, it is possible to evaluate the communication condition with the data of the test pattern even if the data is not supplied.

It is also possible for this data supply device to have a first notification section adapted to give notice of a fact that the transmission direction of the electrical wave has been set to the optimum transmission direction.

According to this data supply device, it is possible to easily know the fact that the transmission direction of the electrical wave has been set to the optimum transmission direction.

It is also possible for this data supply device to have a second notification section adapted to give notice of a fact that the operation mode has been switched from the first mode to the second mode.

According to this data supply device, it is possible to easily know the fact that the operation mode has been switched.

It is possible that the data supply device has an input section adapted to receive input of data from an outside, and the transmission section transmits the data received by the input section.

According to this data supply device, it is possible to further stabilize the communication compared to the configuration of always searching for the optimum transmission direction of the electrical wave while transmitting the data input.

It is possible that the data supply device has a second storage section adapted to store data, and the transmission section transmits the data stored in the second storage section.

According to this data supply device, it is possible to further stabilize the communication compared to the configuration of always searching for the optimum transmission direction of the electrical wave while transmitting the data stored.

Further, according to the invention, there is provided a display system including a display device, and a data supply device adapted to supply the display device with video data, wherein the data supply device includes an input section adapted to receive input of the video data from an outside, a transmission section adapted to transmit the video data, input of which is received by the input section, via an electrical wave, a first control section adapted to switch an operation mode of the transmission section to either one of a first mode of searching for an optimum transmission direction of the electrical wave while transmitting the video data, and a second mode in which the transmission direction is fixed, and a notification section adapted to notify the display device of a fact that switching to the second mode has occurred in a case in which an operation mode of the transmission section has been switched from the first mode to the second mode, and the display device includes a reception section adapted to receive the video data while searching for an optimum reception direction of the electrical wave, a second control section adapted to fix the reception direction of the electrical wave in the reception section in a case in which the notification is received from the data supply device, and a projection section adapted to project a picture represented by the video data received by the reception section.

According to this display system, it is possible to further stabilize the communication compared to the configuration of always searching the optimum transmission direction of the electrical wave while transmitting the data.

It is possible for the display device to include an annunciation section adapted to announce the reception intensity of the electrical wave.

According to this display system, it is possible to easily check the reception intensity of the electrical wave.

Further, according to the invention, there is provided a data supply method including a transmission step in which a transmission section transmits data via an electrical wave, and a step adapted to switch an operation mode of the transmission section to either one of a first mode of searching for an optimum transmission direction of the electrical wave while transmitting the data, and a second mode in which the transmission direction is fixed.

According to this data supply method, it is possible to further stabilize the communication compared to the configuration of always searching the optimum transmission direction of the electrical wave while transmitting the data.

DESCRIPTION OF EMBODIMENTS

1. Outline

In the data transmission via wireless communication, there is known a technology called beam steering. This is a technology for preventing a lack of transmission by changing the direction of an electrical wave in the case in which the transmission condition gets worse due to invasion of a barrier on the transmission channel or a change in the condition of a reflecting surface of the electrical wave when performing the data transmission via the electrical wave having directionality.

Figure 1:
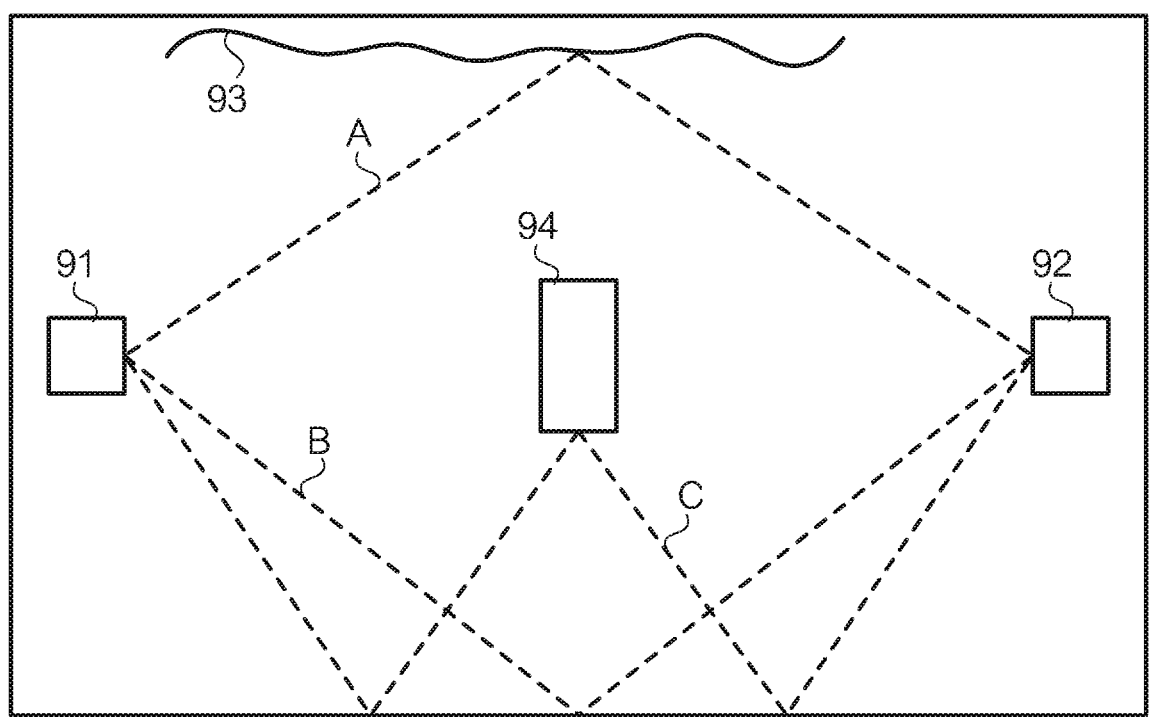
FIG. 1 is a diagram illustrating transmission channels of data.

FIG. 1 is a diagram illustrating an example of the transmission channels of the data. In this example, a transmitter 91 and a receiver 92 are installed in a certain chamber. In the chamber, there are installed a curtain 93 and a piece of furniture 94. As the transmission channels from the transmitter 91 to the receiver 92, there are three channels, namely channels A through C, for example. The channel A is a channel on which the electrical wave is reflected by the curtain 93. The channel B is a channel on which the electrical wave is reflected by the wall surface. The channel C is a channel on which the electrical wave is reflected by the wall surface and the furniture 94. The channels A through C are different in electrical wave intensity and error rate from each other. Based on the electrical wave intensity and the error rate, the optimum transmission channel, namely the transmission direction of the electrical wave, is determined.

There is considered an example in which, for example, it is determined that the channel B is the optimum channel at a certain time point. On this occasion, when the curtain 93 is swayed by a wind, the reflection condition of the electrical wave changes. If the electrical wave intensity and the error rate change in an improving direction, and it is determined that the channel A is a better channel than channel B, the direction of the electrical wave in the transmitter 91 and the receiver 92 is switched to a direction corresponding to the channel A. However, since the sway of the curtain 93 is only temporary, the reflection condition of the electrical wave quickly gets worse again. Then, the direction of the electrical wave in the transmitter 91 and the receiver 92 is switched to a direction corresponding to the channel B. There is a possibility that such a fluctuation of the transmission condition occurs due to a variety of factors such as generation of dust or a movement of a human in the chamber. In particular, in the case of using the transmitter 91 and the receiver 92 while fixed in a set space, if the direction of the electrical wave is switched every time due to such a disturbance, the data transmission becomes rather unstable in some cases. The present embodiment copes with such a problem.

2. Configuration

Figure 2:
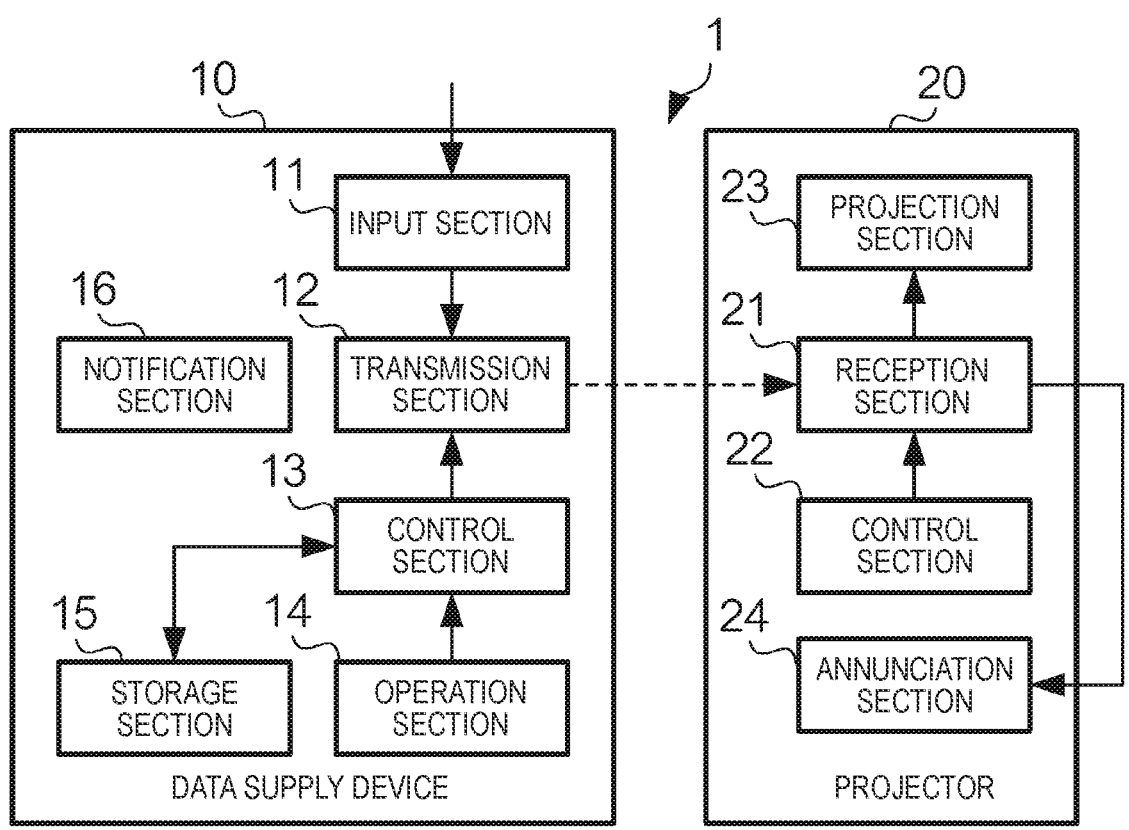
FIG. 2 is a diagram showing a configuration of a projection system 1 according to an embodiment.

FIG. 2 is a diagram showing a configuration of a projection system 1 according to an embodiment. The projection system 1 projects a picture supplied from a video supply device (e.g., a DVD player or a personal computer not shown) on a screen. The projection system 1 has a data supply device 10 and a projector 20. The data supply device 10 is a transmitter (a transmitting device) for wirelessly transmitting the video data supplied from the video supply device to the projector 20. The projector 20 projects the picture corresponding to the video data thus received.

The data supply device 10 has an input section 11, a transmission section 12, a control section 13, an operation section 14, a storage section 15, and a notification section 16. The input section 11 receives input of the video data from the video supply device. The input section 11 includes at least one of, for example, an HDMI (high-definition multimedia interface: registered trademark) terminal, a VGA terminal, a USB terminal, a wired LAN interface, an S terminal, an RCA terminal, a microphone terminal, and a wireless LAN interface as a video input terminal.

The transmission section 12 transmits the video data, input of which is received by the input section 11, via the electrical wave. The transmission section 12 includes, for example, a phased-array antenna. For the transmission of the video data, there is used an electrical wave in, for example, a so-called millimeter waveband (e.g., 60 GHz band). The control section 13 switches the operation mode of the transmission section 12 to either one of a first mode and a second mode. The first mode is a mode for searching for the optimum transmission direction of the electrical wave while transmitting the video data. In the first mode, the data supply device 10 searches for the optimum transmission direction while changing the transmission direction of the electrical wave. The second mode is a mode in which the transmission direction of the electrical wave is fixed. The control section 13 includes, for example, a central processing unit (CPU) and a memory.

The operation section 14 receives an operation by the user for designating the operation mode. The operation section 14 includes, for example, a slide switch or a button. The storage section 15 stores the information for identifying the optimum transmission direction. The storage section 15 (an example of a first storage section) includes a nonvolatile storage device such as a flash memory. The notification section 16 notifies the user of a variety of types of information. The notification section 16 includes, for example, an LED (light emitting diode) lamp or a liquid crystal display. Further, a housing (not shown) of the data supply device 10 is provided with a fixation section (e.g., a screw hole) for physically fixing the data supply device 10 to a structure.

The projector 20 has a reception section 21, a control section 22, a projection section 23, and an annunciation section 24. The reception section 21 receives the video data. Similarly to the transmission section 12, as the operation modes of the reception section 21, there are two modes (referred to as a "third mode" and a "fourth mode" in order to be distinguished from the operation modes of the data supply device). The third mode is a mode for searching for an optimum reception direction of the electrical wave while receiving the video data. In the third mode, the projector 20 searches for the optimum reception direction while changing the reception direction of the electrical wave. The fourth mode is a mode in which the reception direction of the electrical wave is fixed. The reception section 21 includes, for example, a phased-array antenna. When the control section 22 receives a notification that the operation mode of the data supply device 10 has been switched to the second mode from the data supply device 10, the control section 22 fixes the reception direction of the electrical wave in the reception section 21. The control section 22 includes, for example, a CPU and a memory. The projection section 23 projects the picture represented by the video data received by the reception section 21. The projection section 23 includes, for example, an image processing circuit, a light source, an optical system (e.g., a lens, a prism, and a mirror), and a light modulator (e.g., a liquid crystal panel or a digital mirror device). The annunciation section 24 announces a reception intensity of the electrical wave in the reception section 21. The annunciation section 24 includes, for example, an LED lamp or a liquid crystal panel.

Further, a housing (not shown) of the projector 20 is provided with a fixation section (e.g., a screw hole) for physically fixing the projector 20 to a structure.

3. Operations

Operations of the data supply device 10 can be divided into a beam steering mode (an example of the first mode) and a fixed mode (an example of the second mode). The beam steering mode is used when, for example, installing the projection system 1, namely when, for example, newly installing the data supply device 10 and the projector 20 in a certain chamber, or moving the positions of the data supply device 10 and the projector 20 in a certain chamber. The fixed mode is used when using the data supply device 10 and the projector 20, installation of which has already been completed.

In this example, the operation section 14 includes the slide switch, and whether the operation mode of the data supply device 10 is the beam steering mode (an example of the first mode) or the fixed mode (an example of the second mode) is designated depending on the position of a slider. The user operates the slide switch to thereby designate the operation mode of the data supply device 10.

3-1. Beam Steering Mode

Figure 3:
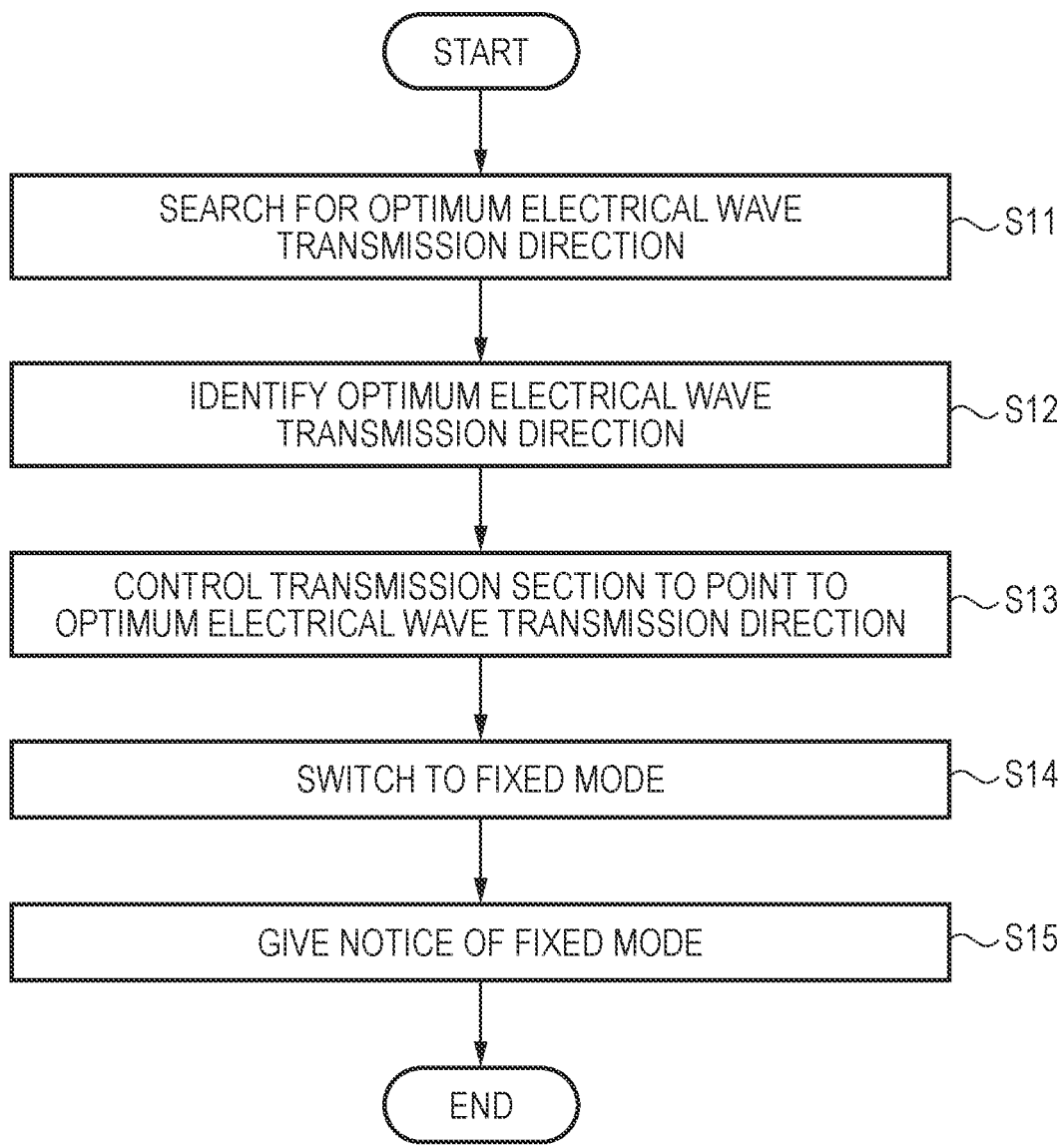
FIG. 3 is a flowchart showing an operation of a data supply device 10 when installed.

FIG. 3 is a flowchart showing an operation of the data supply device 10 in the beam steering mode. Before starting the flow shown in FIG. 3, the data supply device 10 and the projector 20 are each fixed to the structure (e.g., the wall or the ceiling of the chamber, or the furniture). The start of the flow shown in FIG. 3 is triggered by, for example, either one of (1) through (4) described below.

(1) The fact that the data supply device 10 has been powered ON in the state in which the beam steering mode has been designated as the operation mode.

(2) The fact that switching to the beam steering mode has been performed due to an explicit instruction by the user during the operation in the fixed mode.

(3) The fact that degradation of the communication condition between the data supply device 10 and the projector 20 during the operation in the fixed mode has been detected.

(4) The fact that no video data has been input via the input section 11.

In the step S11, the control section 13 searches for the optimum electrical wave transmission direction in the transmission section 12. The details are as follows. For the communication between the transmission section 12 and the reception section 21, there are used two channels, namely HRP (high rate PHY; an example of a first channel) and LRP (low rate PHY; an example of a second channel). The HRP is a communication channel used for high-speed (e.g., 4 Gbps) one-way data transmission. The HRP is used for transmission of the video data. The LRP is a communication channel used for low-speed (e.g., 40 Mbps) two-way data transmission. The LRP is used for a purpose other than the transmission of the video data such as searching for the optimum direction in beam steering. A signal of the HRP and a signal of the LRP are output from a single phased-array antenna in a time-sharing manner.

The control section 13 sets the transmission direction of the electrical wave in the transmission section 12 to a certain angle, and then transmits a question in the LRP. Further, on this occasion, the control section 13 controls the transmission section 12 to transmit a video data of a predetermined test pattern in the HRP. In this case, the reception section 21 has set the reception direction of the electrical wave to a certain angle independently of the transmission section 12. If the transmission direction in the transmission section 12 and the reception direction in the reception section 21 match each other, the reception section 21 can receive the question. When the reception section 21 receives the question in the LRP, the control section 22 receives the video data in the HRP to calculate the reception intensity and the error rate of the electrical wave. In the case in which there has been determined that the reception condition is better than a predetermined standard based on the reception intensity and the error rate, the control section 22 controls the reception section 21 to transmit an answer to the question in the LRP. The answer includes an index (hereinafter referred to as a "reception condition index") of how good the reception condition is, which is represented by the reception intensity and the error rate. When the transmission section 12 receives the answer, the control section 13 stores the information for identifying the transmission direction corresponding to the question and the reception condition index so as to correspond to each other. After transmitting the question at a certain angle for a certain period of time or more, the transmission section 12 changes the transmission direction of the electrical wave to another angle, and then transmits the question in the LRP. In the case in which the answer has not been received within the certain period of time, the control section 13 determines that the transmission direction corresponding to the question is inappropriate. The reception section 21 changes the reception direction of the electrical wave independently of the transmission section 12. The timing for changing the transmission direction in the transmission section 12 and the timing for changing the reception direction in the reception section 21 are preset so that the search for the optimum channel is achievable.

When completing the scan of the transmission direction of the electrical wave in the transmission section 12, the control section 13 identifies (step S12) the direction in which the reception condition index is the highest. The control section 13 stores the information for identifying the direction to the storage section 15.

In the step S13, the control section 13 controls the transmission direction of the electrical wave in the transmission section 12 so as to point to the direction in which the reception condition index is the highest. It should be noted that the search and the control of the optimum reception direction are also performed in a similar manner in the reception section 21.

In the projector 20, the annunciation section 24 announces the reception intensity of the electrical wave in the reception section 21 to the user while the reception section 21 is performing the search for the optimum reception direction. The annunciation section 24 includes, for example, an LED lamp or a liquid crystal display. Alternatively, it is also possible for the annunciation section 24 to include the reception intensity of the electrical wave in the picture to be projected by the projection section 23. Specifically, it is also possible for the annunciation section to display the reception intensity of the electrical wave with so-called OSD (on-screen display).

After the optimum transmission direction and the optimum reception direction are identified, the transmission section 12 periodically transmits the question in the LRP to confirm that the communication with the projector 20 is maintained in a better condition than the predetermined standard condition based on the answer from the reception section 21. In the case in which it has been determined that the communication with the projector 20 has gotten worse than the predetermined standard condition, the control section 13 starts the operation in the beam steering mode from the step S11.

In the step S14, the control section 13 switches the operation mode of the transmission section 12 to the fixed mode. Alternatively, it is possible for the control section 13 to prompt the user to switch the operation mode to the fixed mode. For example, the control section 13 prompts the switching to the fixed mode via the notification section 16.

Alternatively, the control section 13 transmits the data for displaying a screen for prompting the switching to the fixed mode to the projector 20. When the projector has received the data, the projector projects the screen for prompting the switching to the fixed mode on the screen. The user operates the operation section 14 in accordance with the prompting, and switches the operation mode of the data supply device 10 to the fixed mode. When the operation mode is fixed, the control section 13 stops prompting the switching to the fixed mode.

In the step S15, the control section 13 notifies the projector 20 of the fact that the operation mode is the fixed mode. The notification is performed via the LRP. When the control section 22 of the projector 20 has received the notification that the operation mode of the data supply device 10 is the fixed mode, the control section 22 switches the operation mode of the reception section 21 to the fixed mode (an example of a fourth mode). The control section 22 has a register for storing a flag for identifying the operation mode of the reception section 21, and identifies the operation mode based on the value of this flag. The control section 22 rewrites the value of the flag to a value representing the fixed mode. It should be noted that when the control section 22 of the projector 20 has received the question transmitted from the transmission section 12 in the step S11, the control section 22 rewrites the value of the flag to a value representing the beam steering mode (an example of a third mode). The reception section 21 performs the search for the optimum reception direction in the beam steering mode, but does not perform the search for the optimum reception direction in the fixed mode, and the reception direction is fixed.

According to this example, in the data supply device 10 and the projector 20 fixed to the structure, the optimum transmission direction and the optimum reception direction of the electrical wave can be identified. For example, regarding the data supply device 10 and the projector 20 newly installed in a certain chamber, the optimum transmission channel can automatically be identified.

3-2. Fixed Mode

Figure 4:
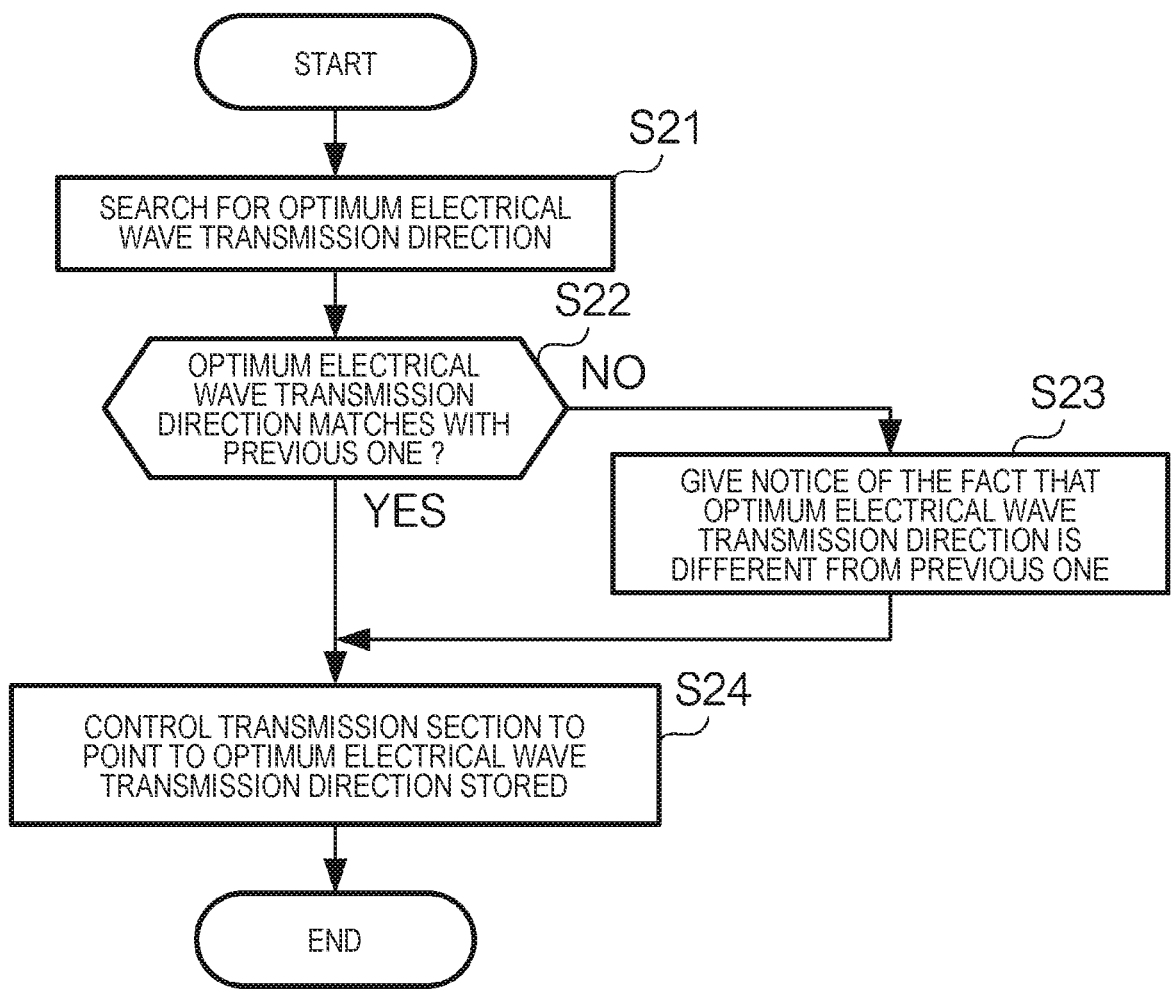
FIG. 4 is a flowchart showing an operation of the data supply device 10 in a fixed mode.

FIG. 4 is a flowchart showing an operation of the data supply device 10 in the fixed mode. The start of the flow shown in FIG. 4 is triggered by, for example, powering ON the data supply device 10.

In the step S21, the control section 13 searches for the optimum transmission direction of the electrical wave in the transmission section 12. This process is performed similarly to, for example, the step S11. In the step S22, the control section 13 determines whether or not the optimum transmission direction obtained in the step S21 is the same as the direction represented by the information stored in the storage section 15. Here, the "same" can be a term meaning complete matching, or can also be a term meaning the state included within a range including a predetermined margin around the state of complete matching. In the case in which it is determined that the both directions coincide with each other (YES in S22), the control section 13 makes the transition of the process to the step S24. In the case in which it is determined that the both directions fail to coincide with each other (NO in S22), the control section 13 makes the transition of the process to the step S23.

In the step S23, the control section 13 notifies the user of the fact that the optimum transmission direction obtained in the step S21 is different from the direction represented by the information stored in the storage section 15. In other words, the control section 13 notifies the user of the fact that the optimum transmission channel in the existing arrangement of the data supply device 10 and the projector 20 is different from the optimum transmission channel in the previous usage of the projection system 1. The notification is performed via the notification section 16. Specifically, the notification section 16 lights, for example, the LED lamp with a specific color or a specific blinking pattern. Alternatively, the notification section 16 displays a message that the optimum transmission channel is different from that in the previous usage on the liquid crystal display.

The shift of the optimum transmission channel from that in the previous usage is caused by a disturbance such as the sway of the curtain described at the beginning of the specification. Alternatively, the shift of the optimum transmission channel from the previous usage is caused by a physical displacement of at least one of the positions of the data supply device 10 and the projector 20. The displacement of the positions of the data supply device 10 and the projector 20 is caused intentionally in some cases, but can also be caused unintentionally in some cases (e.g., a platform in which the data supply device 10 is installed is hit while cleaning the chamber, and thus the position of the platform is displaced). The user determines whether the factor of the shift of the optimum transmission channel from the previous usage is a temporary factor such as the sway of the curtain, or a lasting factor due to the displacement of the positions of the data supply device 10 and the projector 20 based on the circumstances of the chamber. In the case in which it is determined that the factor of the shift of the optimum transmission channel from the previous usage is a lasting factor, the user operates the operation section 14 to instruct the switching to the beam steering mode. In the case in which it has been determined that the factor of the shift of the optimum transmission channel from the previous usage is a temporary factor, it is possible for the user to ignore the notification.

In the step S24, the control section 13 controls the transmission direction of the electrical wave in the transmission section 12 so as to point to the direction identified by the information stored in the storage section 15. Thereafter, until there occurs an event representing the fact that the communication condition with the projector 20 has gotten worse, the search (the beam steering) for the optimum transmission channel is not performed, and the transmission direction in the transmission section 12 and the reception direction in the reception section 21 are kept fixed.

According to this example, the beam steering is not performed in the situation in which it is conceivable that the optimum transmission channel does not change, such as a situation after the positions of the data supply device 10 and the projector 20 are fixed. Therefore, compared to the example of always performing the beam steering irrespective of the situation of the projection system 1, it does not occur that the transmission channel is switched due to a temporary disturbance, and thus, the communication between the data supply device 10 and the projector 20 is further stabilized.

Further, in this example, in the fixed mode, the presence or absence of the shift of the optimum channel from the previous usage is checked at the startup, and in the case in which the shift is present, the user is notified. Therefore, it is possible for the user to easily know the fact that the shift of the optimum channel has occurred.

4. Modified Examples

The invention is not limited to the embodiment described above, but can be implemented with a variety of modifications. Hereinafter, some modified examples will be described. It is also possible to use two or more of the modified examples described below in combination.

4-1. Modified Example 1

The data supply device 10 is not required to have the operation section 14. In this case, the control section 13 switches the operation mode irrespective of the explicit instruction of the user. For example, it is also possible for the control section 13 to execute the process in the beam steering mode every time the data supply device 10 is powered ON. The control section 13 has a register for storing a flag for identifying the operation mode of the data supply device 10, and identifies the operation mode based on the value of this flag. For example, in the step S14 shown in FIG. 3, the control section 13 rewrites the value of the flag to a value representing the fixed mode. Alternatively, in the case in which there has occurred the event representing the fact that the communication condition with the projector 20 has gotten worse, the control section 13 rewrites the value of the flag to a value representing the beam steering mode.

4-2. Modified Example 2

The data supply device 10 is not required to have the storage section 15. In this case, the flow shown in FIG. 4 is not executed, but after the optimum transmission channel is detected in the beam steering mode, the transition to the fixed mode is made automatically, or in accordance with an explicit instruction by the user.

4-3. Modified Example 3

The video data transmitted via the HRP when searching for the optimum transmission direction of the electrical wave is not limited to the predetermined test pattern stored in the storage section 15. It is also possible to transmit video data supplied from a video supply device.

4-4. Modified Example 4

The information notified of by the notification section 16 is not limited to what is illustrated in the embodiment. For example, the notification section 16 can also give notice of the fact that the transmission direction of the electrical wave is set to the optimum transmission direction (an example of a first notification section). Alternatively, it is also possible for the notification section 16 to give notice of the fact that the operation mode of the data supply device 10 has been switched from one of the first mode and the second mode to the other thereof (an example of a second notification section). Further, the notification section 16 can also be omitted.

4-5. Modified Example 5

In the operation in the fixed mode, the process of the steps S21 and S22 can also be omitted. In other words, in the fixed mode, the search for the optimum transmission direction when powered ON is not required to be performed.

4-6. Other Modified Examples

The data transmitted by the data supply device 10 to the projector 20 is not limited to the video data received from the video supply device. It is also possible for the data supply device 10 to transmit the video data stored in the storage section 15 (an example of a second storage section in this case) to the projector 20. The storage section (the first storage section) for storing the information for identifying the optimum transmission direction and the storage section (the second storage section) for storing the video data can be the same, or can also be devices physically different from each other.

The hardware configuration of the data supply device 10 and the projector 20 is not limited to what is illustrated in the embodiment. For example, the transmission section 12 of the data supply device 10 can have two antennas, namely an antenna for HRP transmission and an antenna for LRP transmission. Further, for example, the projector 20 is not required to have the annunciation section 24.

A counterpart device to which the data supply device 10 supplies the data is not limited to the projector 20. Any device can be adopted as the counterpart device as long as the device processes the data transmitted wirelessly, and the data transmitted is not limited to the video data. For example, the counterpart device can be a music player device, and the data transmitted wirelessly can be music data.

The entire disclosure of Japanese Patent Application No. 2015-223884, filed Nov. 16, 2015 is expressly incorporated by reference herein.

REFERENCE SIGNS LIST

1 projection system
10 data supply device
11 input section
12 transmission section
13 control section
14 operation section
15 storage section
16 notification section
20 projector
21 reception section
22 control section
23 projection section
24 annunciation section

The invention claimed is:

1. A data supply device comprising:
   a transmission section adapted to transmit data via an electrical wave;
   a control section adapted to switch an operation mode of the transmission section to either one of a first mode of searching for an optimum transmission direction of the electrical wave while transmitting the data, and a second mode in which the transmission direction is fixed;
   an operation section adapted to designate the operation mode; and
   a first storage section adapted to store information for identifying the optimum transmission direction,
   wherein in a case in which the second mode is designated as the operation mode in the operation section in a case in which the data supply device is powered ON, the control section controls the transmission direction of the electrical wave to a direction identified by the information stored in the first storage section.

2. The data supply device according to claim 1, wherein in a case in which a transmission condition of the electrical wave gets worse than a predetermined condition while the transmission section is operating in the second mode, the control section switches the operation mode to the first mode.

3. The data supply device according to claim 1, wherein in a case in which no data has been input, the control section switches the operation mode to the first mode.

4. The data supply device according to claim 1, wherein the transmission section transmits data of a test pattern determined in advance via the electrical wave.

5. The data supply device according to claim 1, further comprising:
   a first notification section adapted to give notice of a fact that the transmission direction of the electrical wave has been set to the optimum transmission direction.

6. The data supply device according to claim 1, further comprising:
   a second notification section adapted to give notice of a fact that the operation mode has been switched from the first mode to the second mode.

7. The data supply device according to claim 1, wherein the data supply device has an input section adapted to receive input of data from an outside; and
   the transmission section transmits the data received by the input section.

8. The data supply device according to claim 1, wherein the data supply device has a second storage section adapted to store data; and
   the transmission section transmits the data stored in the second storage section.

9. A display system comprising:
   a display device; and
   a data supply device adapted to supply the display device with video data,
   wherein the data supply device includes
      an input section adapted to receive input of the video data from an outside,
      a transmission section adapted to transmit the video data, input of which is received by the input section, via an electrical wave,
      a first control section adapted to switch an operation mode of the transmission section to either one of a first mode of searching for an optimum transmission direction of the electrical wave while transmitting the video data, and a second mode in which the transmission direction is fixed, and
      a notification section adapted to notify the display device of a fact that switching to the second mode has occurred in a case in which an operation mode of the transmission section has been switched from the first mode to the second mode, and
   the display device includes
      a reception section adapted to receive the video data while searching for an optimum reception direction of the electrical wave,
      a second control section adapted to fix the reception direction of the electrical wave in the reception section in a case in which the notification is received from the data supply device, and
      a projection section adapted to project a picture represented by the video data received by the reception section.

10. The display system according to claim 9, wherein the display device has an annunciation section adapted to announce a reception intensity of the electrical wave.

11. A data supply method for a data supply device, the method comprising:

a step in which a transmission section transmits data via an electrical wave;

a step adapted to switch an operation mode of the transmission section to either one of a first mode of searching for an optimum transmission direction of the electrical wave while transmitting the data, and a second mode in which the transmission direction is fixed;

a step in which the operation mode is designated; and a step adapted to store information for identifying the optimum transmission direction, wherein in a case in which the second mode is designated as the operation mode in a case in which the data supply device is powered ON, the transmission direction of the electrical wave is controlled to a direction identified by the stored information.

\* \* \* \* \*